US006701448B1

United States Patent
Akyol et al.

(10) Patent No.: US 6,701,448 B1
(45) Date of Patent: Mar. 2, 2004

(54) ESTABLISHING AND MAINTAINING MASTER AND STANDBY LAN EMULATION SERVER CONNECTIONS TO PROVIDE A FAULT TOLERANT ELAN

(75) Inventors: Cihangir M. Akyol, Los Gatos, CA (US); Bradley A. Benson, Portola Valley, VA (US); Badri Ramaswamy, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/416,077

(22) Filed: Oct. 12, 1999

(51) Int. Cl.[7] .................................................. H02H 3/05
(52) U.S. Cl. ...................................... 714/4; 370/395.53
(58) Field of Search ............................ 714/4, 11, 12, 714/13; 709/208, 209, 229; 370/216, 395.53, 396, 404

(56) References Cited

U.S. PATENT DOCUMENTS

| | | | | |
|---|---|---|---|---|
| 5,317,562 A | | 5/1994 | Nardin et al. .................. 370/16 |
| 5,473,599 A | | 12/1995 | Li et al. ......................... 370/16 |
| 5,581,552 A | | 12/1996 | Civanlar et al. .............. 370/396 |
| 5,600,644 A | * | 2/1997 | Chang et al. ................. 370/257 |
| 5,617,417 A | | 4/1997 | Sathe et al. ................... 370/394 |
| 5,623,534 A | * | 4/1997 | Desai et al. .................... 379/59 |
| 5,661,719 A | * | 8/1997 | Townsend et al. ........... 370/216 |
| 5,734,824 A | * | 3/1998 | Choi ............................. 370/254 |
| 5,815,668 A | * | 9/1998 | Hashimoto ............. 395/200.68 |
| 5,835,481 A | | 11/1998 | Akyol et al. ................. 370/216 |
| 6,173,312 B1 | * | 1/2001 | Atarashi et al. ............. 709/203 |
| 6,212,521 B1 | * | 4/2001 | Minami et al. ................ 707/10 |

OTHER PUBLICATIONS

The ATM Forum Technical Committee, "LAN Emulation over ATM Version 2—LUNI Specification", AF–LANE–0084.000, Jul. 1997.
The ATM Forum Technical Committee, LAN Emulation Over ATM, Version 1.0, af–lane–0021.000, Jan. 1995.
The ATM Forum Technical Committee, "LAN Emulation Over ATM, Version 1.0 Addendum", af–lane–0050.000, Letter Ballot, Dec. 1995.

* cited by examiner

Primary Examiner—Dieu-Minh Le
(74) Attorney, Agent, or Firm—Baker Botts L.L.P.

(57) ABSTRACT

A system and method are disclosed for transferring an enhanced LAN Emulation Client from a first LAN Emulation Server to a second LAN Emulation Server. The addresses of the first LES and the second LES are determined at an LECS. The first LES and the second LES are connected to the LECS. The addresses of the first LES and the second LES are sent to the enhanced LEC so that the addresses of the first LES and the second LES may be stored at the enhanced LEC. When the enhanced LEC determines that the first LES has failed, the address of the second LES is looked up at the enhanced LEC and the enhanced LEC connects to the second LES.

28 Claims, 5 Drawing Sheets

ESTABLISHING AND MAINTAINING MASTER AND STANDBY LAN EMULATION SERVER CONNECTIONS TO PROVIDE A FAULT TOLERANT ELAN

FIELD OF THE INVENTION

The present invention relates generally to LAN emulation. More specifically, a system for establishing and maintaining master and standby LAN emulation server connections to provide a fault tolerant LAN without creating excess traffic or load on an LECS is disclosed.

BACKGROUND OF THE INVENTION

Purpose of LAN Emulation

In general, the purpose of Asynchronous Transfer Mode (ATM) LAN Emulation (LANE) is to emulate a multiple-access, broadcast media (e.g., Etheniet) over a point-to-point, virtual circuit oriented media (ATM). The specification for LAN Emulation over an ATM may be found in the LANE ATM specification, "LAN emulation over ATM" version 1.0 Document No. AF-LANE-0021 which is herein incorporated by reference, "LAN emulation over ATM Version 1.0 Addendum" Document No. AF-LANE-0050.000 which is herein incorporated by reference (collectively, the "LANE specification version 1"), and in version 2 of the LANE ATM specification, "LAN emulation over ATM Version 2 LUNI Specification Documnent No. AF-LANE-0084.000 which is herein incorporated by reference (the "LANE specification version 2"). It is necessary to emulate the services available over the LAN so that the existing base of software can take advantage of the ATM network. LANE provides an easy way to connect existing LAN applications into the ATM environment by supporting "unmodified" interaction amongst legacy applications on the ATM network, and by supporting the interconnection of ATM networks with legacy LAN's. This provides interoperability between applications on the ATM network and those on legacy LANs.

LAN Emulation Components

Figure 1A:
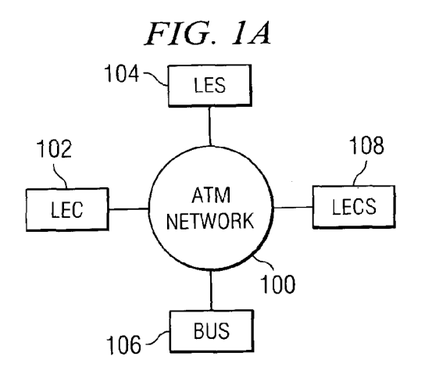
FIG. 1A shows the components of an emulated LAN (ELAN) implemented over an ATM network.

FIG. 1A shows the components of an emulated LAN (ELAN) implemented over an ATM network 100. The ELAN components include at least one LEC 102. LEC 102 may include end stations (e.g., hosts), routers or bridges and each LEC 102 is responsible for setting up the association with the ELAN assets to provide LANE services to a local host or router. Two other components of the LANE service are a LAN Emulation Server (LES) 104 and a Broadcast and Unknown Server (BUS) 106. LES 104 provides a registration facility to allow clients to register unicast and multicast media access control (MAC) addresses and/or ring route descriptors, and a forwarding service for control frames. BUS 106 receives frames from LEC 102 and retransmits them to other LEC's on the ELAN. The LANE Service may use more than one BUS, and the BUS 106 may be distributed over multiple physical entities or collocated on a single box. In certain implementations, a single LES/BUS is collocated on one router. Another ELAN component, an LECS 108, enables LEC 102 to find and to connect to LES 104 for the proper ELAN over the ATM network 100.

LES 104 and LECS 108 are referred to as "edge devices" on the ELAN because they are not required for the operation of the ATM network itself, but are required in order for the ATM network to emulate a LAN. The functions and protocols implemented for these devices are further described in the LANE specification.

The LECS, LES and BUS may be implemented on various network devices including switches, hosts, routers or bridges. Any device which includes an ATM interface and can support virtual circuits may function as the LECS or LES, including a PC with an ATM interface. Such devices include a processor capable of executing logic operations and memory, along with an ATM interface. Based on the operations executed by the processor, the device is able to process outside events, record those events in memory, and also to determine states and store those states in memory.

Figure 1B:
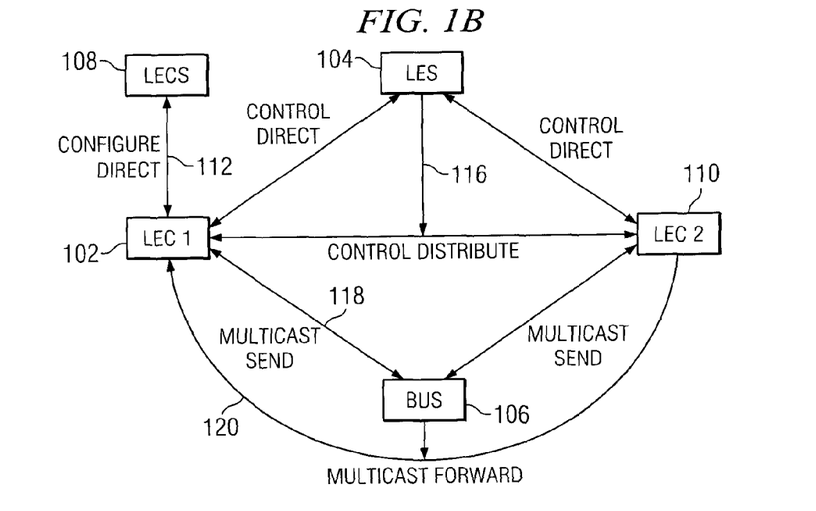
FIG. 1B shows how a LEC connects to the LANE service so that the LEC may perform data forwardings address resolution and registration of MAC addresses with an LES.

FIG. 1B shows how LEC 102 connects to the LANE service so that LEC 102 may perform data forwarding, address resolution and registration of MAC addresses with LES 104. When LEC 102 wishes to connect to an ELAN, it locates LECS 108 on ATM network 100 at a well-known address, and then sets up a point to point configure direct connection 112 with LECS 108. LECS 108 services configuration requests from LEC 102 and tells LEC 102 which ELAN it should join and the address of the LES that it should use. LEC 102 then sets up a control direct connection 114 with LES 104. LES 104 establishes a point to multipoint connection 116 with LEC 102, as well as with any other LEC 110 on the ELAN. Finally, LEC 102 establishes a multicast send point to point connection 118 with BUS 106 and a point to multipoint multicast forwvard connection 120 is set up between BUS 106 and LEC 102 and any other LEC 110.

Once LEC 102 registers with LES 104, it receives address resolution requests for unregistered destinations from LES 104. LES 104 provides a registration facility to allow clients to register unicast and multicast MAC addresses and/or token ring route descriptors, and a forwarding service for control frames. Optionally, it may generate control frames. Bridges may register with LES 104 any MAC addresses that they are capable of foraarding. BUS 106 receives frames from clients or other multicast servers, and retransmits them to other clients. There is at least one BUS in an emulated LAN which handles broadcast and multicast addresses.

In order for the ELAN to function, the servers that function as LES 104 and LECS 108 must remain operational. Wien LEC 102 wants to participate in the ELAN, it must first ask LECS 108 for the address of LES 104 and then execute a joining procedure with the LES. When this transaction is completed, LEC 102 connects to LES 104. This completes the joining of LEC 102 to the ELAN. LEC 102 must maintain a control direct connection with LES 104 as long as it continues to be connected to the ELAN. LES 104 and LECS 108 therefore represent potential single points of failure for the ELAN. Although the LANE specification details the operation of the LECS's and the LES's as described above, there is no provision for a system of redundant or backup servers.

What is needed is a redundancy scheme that provides a way for backup or slave servers to automatically and transparently take over the tasks of a failed master server so that the LANE service may continue to operate without significant disruption. Because LES 104 and LECS 108 may be interconnected to a numerous and changing group of LEC's, a way is needed to both detect failure of these edge devices and redesignate a slave or backup device as the master device and also to reconnect the LEC's to the new master devices with minimum disruption to the LEC's.

In addition, in a system where a large number of LEC's may be connected to an LES, a method is needed to direct LEC's to a backup LES upon failure of a master LES that does not require all of the LEC's to contact the LECS. Also, it would be desirable if a method of determining a master LES from among a group of available LES's could be devised that would minimize switching among LES's while a system is being brought on line. Finally, it is important that such a system be able to accommodate older LECS's, LES's and LEC's that have not been modified to operate in the system as well as LECS's, LES's and LEC's that have been designed to operate in the system. Thus, a robust redundancy scheme compatible with the LANE specification that reduces backend traffic between LES's and the master LECS and that also reduces the need for clients to contact an LECS when an LES fails is needed.

SUMMARY OF THE INVENTION

A redundancy scheme that reduces backend traffic between LES's and the master LECS and that also reduces the need for clients to contact an LECS when an LES fails is disclosed. The master LECS broadcasts configuration information to all LES's that includes a list of the master LES and any available backup LES's. This information is relayed by the LES's to modified LEC's that keep track of the available LES's. The LEC's use such information instead of contacting the LECS to determine the master LES before joining the LAN. When the master LES fails, LEC's may switch over to the highest priority backup LES without contacting the LECS. In addition, a method is disclosed for designating the first LES made available as the master LES to avoid moving LEC's when a higher priority LES comes on line. Finally a system wherein LES's verify LEC's without contacting the LECS is disclosed.

It should be appreciated that the present invention can be implemented in numerous ways, including as a process, an apparatus, a system, a device, a method, or a computer readable medium. Several inventive embodiments of the present invention are described below.

In one embodiment, a method of transferring an enhanced LAN Emulation Client from a first LAN Emulation Server to a second LAN Emulation Server includes determining at an LECS the addresses of the first LES and the second LES. The first LES and the second LES are connected to the LECS. The addresses of the first LES and the second LES are sent to the enhanced LEC so that the addresses of the first LES and the second LES may be stored at the enhanced LEC. When the enhanced LEC determines that the first LES has failed, the address of the second LES is looked up at the enhanced LEC and the enhanced LEC connects to the second LES.

These and other features and advantages of the present invention will be presented in more detail in the following specification of the invention and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

A detailed description of a preferred embodiment of the invention is provided below. While the invention is described in conjunction with that preferred embodiment, it should be understood that the invention is not limited to any one embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention. The present invention may be practiced according to the claims without some or all of these specific details. For the purpose of clarity, details relating to technical material that is known in the technical fields related to the invention has not been described in detail in order not to unnecessarily obscure the present invention in such detail.

Definitions

The following terms and acronyms are used in the instant specification. Their definitions are provided here to assist in understanding the preferred embodiments described herein.

ATM address The ATM address is the address given to the User Network Interface (UNI) to identify the endpoint to which the user wishes to connect.

BUS Broadcast and Unknown Server. The BUS receives frames from LEC's and retransmits them to other LEC's on the ELAN.

ELAN Emulated LAN. The emulation of a single Ethernet LAN or Token Ring LAN segment over ATM.

LAN Local Area Network

LANE LAN Emulation. The mechanism which emulates a multicast LAN media over a circuit switched network.

LEARP LAN Emulation Address Resolution Protocol

LEC LAN Emulation Client. The LEC is responsible for setting up the association with the LES and BUS to provide LAN emulation services to the local host or router.

LECS LAN Emulation Configuration Server. The LECS exists somnewhere in the ATM network at a well-known address and tells the LEC which ELAN it should join.

LES LAN Emulation Server. The LES provides a registration facility to allow clients to register unicast and multicast MAC addresses and/or ring route descriptors, and a forwarding service for control frames.

MAC Address A MAC address is an address of a device at tile sublayer of the data link layer, defined by the IEEE 802 committee that deals with issues specific to a particular type of LAN. The types of LAN for which MAC addresses are available include token ring, FDDI, and Ethenet. A MAC address is generally intended to apply to a specific physical device no matter where it is plugged into the network. Thus, a MAC address is generally hardcoded into the device—on a router's ROM, for example. This should be distinguished from the case of a network layer address, described above, which changes depending upon where it is plugged into the network. MAC is an acronym for Media Access Control.

Packet A packet is a collection of data and control information including source and destination node addresses, formatted for transmission from one node to another. In the context of this invention, it is important to note that hosts on one LAN send packets to hosts on another LAN through a router or bridge connecting the LANs.

Systems and Environment

As described below, the present invention provides methods for providing backup LECS's and LES's in a LAN emulation on an ATM network. In addition, the present invention provides apparatus for performing these backup methods. The apparatus of this invention may be specially constructed for the required purposes, or it may be a general-purpose programmable machine selectively activated or configured by firmware or a computer program. Such devices preferably include an ATM interface along with a memory and a processor capable of executing logic operations. Based on the operations executed by the processor, the device is able to process outside events, record those events in memory, and also to determine states and store those states in memory. Examples of suitable machines include routers, bridges, switches, workstations, personal computers, and virtually any intelligent machine on a network. In each case, Such machine must be configured to act as an LEC, LES, or LECS in accordance with this invention.

In one example, the LEC, LES, or LECS of this invention is implemented on a router. Generally, such router may include a master central processing unit (CPU), an ATM interface, and low, medium, and high-speed interfaces. In preferred embodiments, the CPU is responsible for such router tasks as routing table computations and network management. It may include one or more microprocessor chips such as the MIPS R4600 reduced instruction set computer (RISC) chip, or other available chips. In a preferred embodiment, non-volatile RAM and/or ROM also form part of the CPU. Of course, there are many acceptable ways in which memory could be coupled to the system.

The interfaces may be provided as interface cards. Generally, they control the sending and receiving of data packets over the network and sometimes support other peripherals used with the router. The low and medium speed interfaces may include a multiport communications interface, a serial communications interface, and a token ring interface. The high-speed interfaces may include an FDDI interface and a multiport Ethernet interface. Preferably, each of these interfaces (low/medium and high speed) includes (1) a plurality of points appropriate for communication with the appropriate media, and (2) an independent processor, and in some instances (3) volatile RAM. The independent processors control such communications intensive tasks as packet switching and filtering, and media control and management. By providing, separate processors for the communications intensive tasks, this architecture permits the master microprocessor to efficiently perform routing computations, network diagnostics, security functions, etc.

The low and medium speed interfaces are coupled to the master CPU through a data, control, and address bus. High-speed interfaces are connected to the bus through a fast data, control, and address bus which is in turn connected to a bus controller.

As noted, a properly configured device will include an ATM interface and means for supporting virtual circuits. The appropriate hardware and software for providing ATM interfaces is generally known in the field. In 1991, an entity known as the ATM Forum was founded to standardize ATM technology. A substantial body of information regarding deployment of ATM technology is available from the ATM Forum. Cites to many references pertaining to ATM technology are available through the ATM Forum's World Wide Web site at www.ATMForum.com. Specific references include McDysan et al., "ATM Theory and Application," McGraw Hill, 1995; Minoi et al., "ATM & Cell Relay Service for Corporate Environments," McGraw Hill, 1994; and Prycker, "Asynchronous Transfer Mode—Solution for Broadband ISDN, 2nd Edition, Ellis Horvood, 1993. Each of these references is incorporated herein by reference for all purposes.

Specific ATM-capable hardware includes the 7000 series of routers and the LightStream® line of ATM switches available from Cisco Systems, Inc. of San Jose Calif. In addition, add-on ATM adapters are available from Cisco Systems and other companies providing networking equipment.

LAN emulation and the associated redundancy capability of this invention may be provided on the above-mentioned ATM hardware via software or hardware modules. In a preferred embodiment, software for implementing the redundancy capability is provided as a modified version of the suite of programs provided by Cisco Systems, Inc. as the Cisco Internet work Operating System (Cisco IOS®) software for ATMs. Of course, other systems such as workstations running a UNIX operating system (e.g., a SPARCStation available from Sun Microsystems of Mountain View California) may be configured to implement the present invention.

Figure 2:
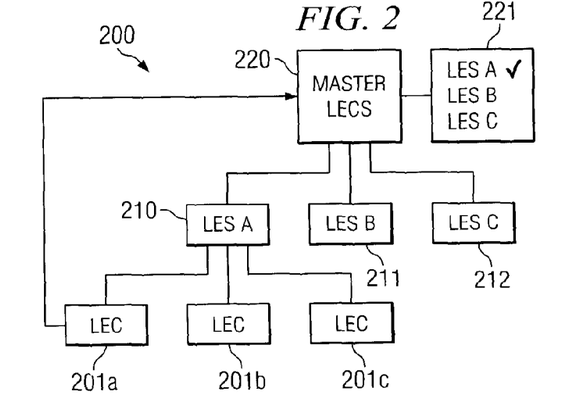
FIG. 2 is a block diagram illustrating a LAN emulation system 200 that services LEC's 201A, 201B, and 201C.

FIG. 2 is a block diagram illustrating a LAN emulation system 200 that services LEC's 201A, 201B, and 201C. The three LEC's are connected to an LES 210. Each LEC has a data connection to LES 210 that allows point to point communication in both directions as well as broadcast communication of data to all of the LEC's. These data connections are not shown in FIG. 2. Instead, only the control direct connection from the LES to each of the LEC's is shown.

In addition to LES 210, an LES 21 1 and a LES 212 are included in the system as well. The extra LES's serve as backups should LES 210, which is designated as the master LES, fail. Each of the LES's makes a back channel control direct connection with the master LECS 220. Master LECS 220 keeps track of all of the LES's that are connected to the master LECS in a memory 221. In addition, master LECS 220 keeps track of which LES has been designated as the master LES at any given time. In the example shown, LES 210, which is labeled LES A, has been designated as the master LES and this is shown for the purpose of illustration in memory 221 using a check mark. In practice, the master state of LES 210 may be noted by setting a flag in memory 221 or by some other appropriate technique. In addition to the control direct connection maintained by each LEC to a master LES, each LEC also may temporarily establish a CONFIG direct connection to master LECS 220 for the purpose of obtaining the address of the master LES when an LEC wishes either to join the ELAN for the first time or to rejoin the ELAN after the connection between the LEC and the master LES has been broken for some reason.

A similar LAN emulation system to that shown in FIG. 2 is also described in U.S. Pat. No. 5,835,481 by Akyol et. al. ("the '481 patent") which is herein incorporated by reference for all purposes. This system allows the ELAN to continue to function after a master LES fails. If the master LES fails, then each of the LEC's contact the master LECS. The master LECS then sends the address of the new master LES to the LEC's so that they may rejoin the ELAN. In certain systems having a large number of LEC's, it has been discovered that this scheme may create a very large amount of traffic from the LEC's to the master LECS 220. It should be noted that, as described in the '481 patent, backup LECS's which are not shown in FIG. 2 may also be included for the purpose of serving in the event that LECS 220 fails. Hence, LECS 220 may either be the only LECS or a master LECS.

To understand the amount of traffic potentially generated at LECS 220, it is useful to consider the chain of events that occurs each time an LEC joins or rejoins the ELAN. First, the LEC sends a CONFIG request to the master LECS. The LECS responds to the CONFIG request by sending a CONFIG response to the LEC. The CONFIG response from the LECS contains the address of the master LES to which the LEC should establish a connection for the purpose of joining the ELAN. After the LEC receives the CONFIG response from the LECS, the LEC sends adjoin request to the master LES. The master LES then contacts the LECS for the purpose of verifying that the LEC is allowed to join the ELAN. To that end, the LES sends a CONFIG request to the LECS. This CONFIG request may also be referred to as a verification request. The LECS then sends a CONFIG response to the LES, instructing the LES either to allow the client to join the ELAN or to drop the client. If the client is allowed to join, then the LES sends adjoin response to the LEC and the LEC successfully joins the ELAN.

As can be seen from the above narrative, the LECS is contacted twice (once by the LEC and once by the LES) each time that an LEC joins the ELAN. When an LES fails and a large group of LEC's are dropped, the LECS may be flooded with CONFIG requests from each of the dropped LEC's as well as requests from the new master LES to verify each of the LEC's attempting to establish connections with it. Thus, although the system shown in FIG. 2 effectively provides a set of backup LES's, it would be useful if the system could be modified both to reduce the amount of LEC traffic to the LECS as well as the amount of backend traffic between the LES's and the LECS.

Figure 3:
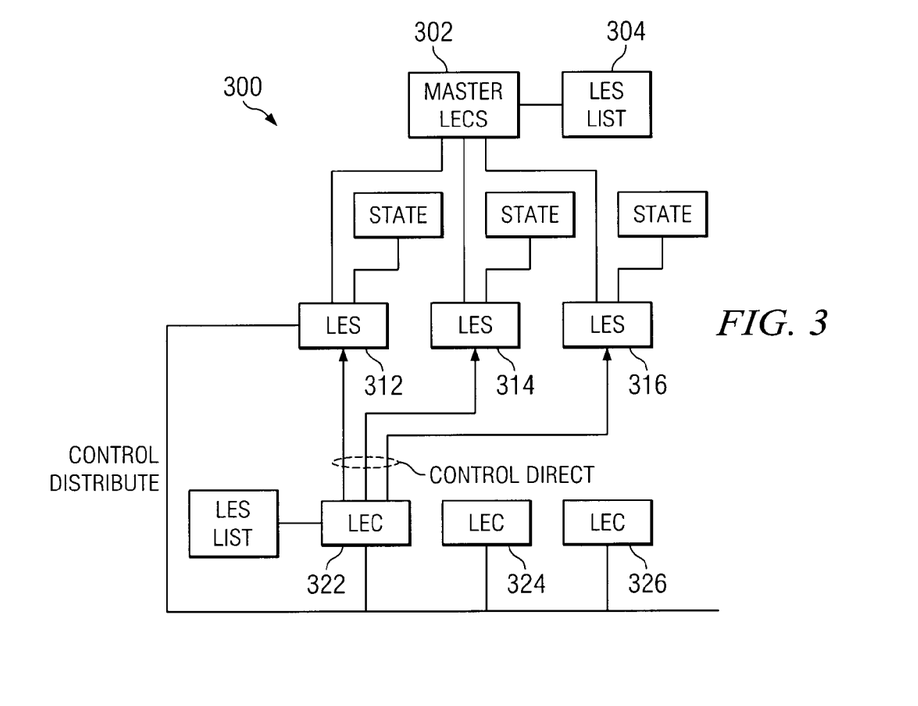
FIG. 3 is a block diagram illustrating a LAN emulation system 300 that reduces the traffic to the master LECS.

FIG. 3 is a block diagram illustrating a LAN emulation system 300 that reduces the traffic to the master LECS. Again, as noted above, the master LECS may be a master LECS determined as described in the 481 patent or the master LECS may be the only LECS provided for the system. Master LECS 302 stores an LES list in a memory 304. The LES list includes each of the LES's connected to the master LECS. In addition, the LECS determines which of the LES's is the master LES. This determination is further described in FIG. 7. In addition to keeping track of which LES is the master LES itself, master LECS 302 also sends packets to each of the LES's that indicate which LES is the master LES. Master LECS 302 also provides a list of all the LES's available in the system.

Figure 4:
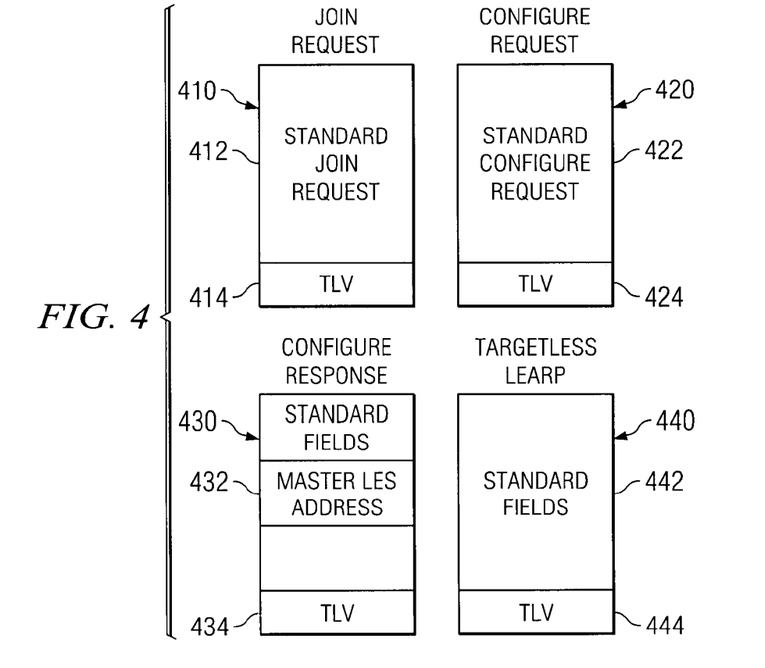
FIG. 4 is a block diagram illustrating several of the packet formats described in connection with FIG. 3.

In the example shown, three LES's, 312, 314, and 316, are shown connected to LECS 302. Each of the LES's also includes a memory that contains a flag or other data structure used for the purpose of storing the state of the LES, that is, whether the LES is the master LES or a backup LES. The packets sent from master LECS 302 to the LES's on the CONFIG direct connections to the LES's are illustrated in FIG. 4. In addition to checking the control packets sent by master LECS 302, each LES forwards a list of LES's provided by the master LECS to any LEC's that may be connected to an LES.

In the example shown, three LEC's, 322, 324, and 326, are shown connected to LES 312, which has been designated as the master LES. In addition to a point to point control direct connection made from each of the LEC's to each of the LES's, a control distribute connection is also established between each LEC and each of the LES's for the purpose of broadcasting control information to the LEC's. In the diagram shown, the control direct connection from LEC 322 to each of the LES's is shown as well as the control distribute connection between LEC 322 and LES 312. LEC 324 and LEC 326 also participate in the same control distribute connection. The control direct connections between LEC 324 and the LES's and LEC 326 and the LES's are not shown for the purpose of simplifying the diagram, but it should be recognized that the connections exist.

LES 312 takes the LES list including the designation of the master LES received from the master LECS and relays it to the LEC's via the control distribute connection with the LEC's. In one embodiment, the LES list is relayed from the LES to the LEC's using a targetless LEARP packet. (The LES list is first derived by the LES from the CONFIG response frame sent from the LECS to the LES.) Targetless LEARP packets are specified in version 2 of the LAN emulation specification. As will be described further in FIG. 4, a targetless LEARP packet includes one or more type link value (TLV) fields that may be used to carry information not specified in the LAN emulation specification. According to the specification, a targetless LEARP packet is supposed to follow a normal LEARP packet. By utilizing a targetless LEARP packet to carry information from the LECS to the LEC's via the LES's, the system provides a way to send the LES list to the LEC's.

If an LEC is not configured to accept such information, then the LEC may either ignore the targetless LEARP that it receives or treat the targetless LEARP as an error since it was not preceded by a normal LEARP packet. LEC's that are configured to receive such targetless LEARPS and extract the LES list from the TLV field in the LEARP packet that includes that list are referred to as enhanced LEC's.

As is described further in FIG. 4, a control packet sent from the master LECS to an LES may contain one or more TLV fields. An LES that is capable of recognizing such a TLV field that includes a list of the LES's is referred to as an enhanced LES. It should be noted that an enhanced LES may either determine whether it is the master LES by looking at the master LES address provided by the master LECS in the target ATM address field or by checking whether the address of the enhanced LES is the first address listed in the TLV field used to provide the LES list.

Thus, enhanced LES's are able to determine their own state based on control packets received from the LECS. In addition, enhanced LES's pass along the TLV field in packets sent to the LEC's. As described above, a targetless LEARP is used in one embodiment to transfer this information to the LEC's. In some embodiments a control direct connection from the LES to the LEC's may be used in a system that does not support the targetless LEARP on the control distribute. In addition, it should be noted when an LEC first joins the ELAN, the CONFIG response received from the master LECS by the LEC may also contain the TLV that contains a listing of all available LES's. Thus, each LEC discovers not only the address of the master LES but also the addresses of all backup LES's that are available.

Each LEC opens a control direct connection with both the master LES and one or more of the backup LES's. In one embodiment, the LES list is ordered. The first LES in the list is the master LES; the second LES in the list is the first backup LES; the third LES in the list is the second backup LES, and so on. Thus, when the master LES fails, the LEC already has a connection set up to the first backup LES and may transfer to that backup LES without contacting the master LECS. This avoids all of the LEC's contacting the master LECS upon the failure of the master LES.

Traffic on the back end connection between the LES's and the master LECS is also reduced because the LES's may accept all connections from LEC's without verifying such connections with the master LECS. Since the enhanced LEC's in the system are aware of all the LES's and which LES is the master LES, the backup LES's may accept a connection from an LEC without being concerned that the LEC is mistakenly connecting to the wrong master LES. Because each LEC is continually receiving an updated list of LES's from the LECS, the LES need not break the connection or refuse the connection from the LEC for the purpose of sending the LEC back to the LECS to get the correct master LES address.

As noted above, it is important that the system also be able to accommodate unenhanced LEC's as well as enhanced LEC's. Unenhanced LEC's receiving the targetless LEARP packet that includes the LES list, as described above, ignore the targetless LEARP packet and therefore do not discover the LES list information. In addition, unenhanced LEC's receiving a CONFIG response from the LECS including the TLV field that includes the LES list are not able to extract the LES list from the TLV field.

Such unenhanced LEC's are detected by the backup LES's and their connections are refused or dropped whenever such LES's are in the backup state. In one embodiment, unenhanced LEC's are recognized because such LEC's do not include a blank or dummy TLV field in the position used by the LECS and LES's to transfer the LES list information. Enhanced LEC's, on the other hand, include such a TLV field in packets directed from the enhanced LEC's to the LES's. Thus, the enhanced LES's may accept all connections from enhanced LEC's and accept connections from unenhanced LEC's only when the LES is in the master state.

It should also be noted that in some embodiments, enhanced LES's may be included in systems that include unenhanced LECS's. Unenhanced LECS's are LECS's that are not configured to send LES list information to the LES's and LEC's serviced by the unenhanced LECS. When placed in such a system, enhanced LES's treat each LEC as if it were an unenhanced LEC and the system functions in a similar manner as the system described in FIG. 2. Since each of the LEC's only receives the address of the master LES from the unenhanced LECS, a backup LES must break or refuse a connection made to it by an LEC so that the LEC will return to the unenhanced LECS and obtain the correct master LES address.

In one embodiment, the master LECS periodically sends a packet to the LES's that includes a TLV field containing the list of LES's. For example, the master LES may every minute send a CONFIG response packet to each of the LES's containing such a TLV field. The LES's then forward the list contained in the TLV field in another TLV field included as part of a targetless LEARP packet. In addition, if the master LES ever fails, and that failure is detected by the LECS, then the LECS sends an unsolicited CONFIG response packet that includes the TLV of all the correct updated LES list for the purpose of immediately updating the LES list and informing both the LES's and the LEC's via the LES's of the new master LES address.

It should be noted that, in the discussion above, certain types of packets are described as carrying the LES list in a TLV field. It should be noted that other types of packets including data packets may be used to transfer the LES list in different embodiments. Also, other fields or parts of a packet may be used to carry the LES list downstream from the LECS. Also, other types of packets including data packets may be used to transfer the LES list from the LES's to the LEC's.

The system shown in FIG. 3 illustrates how traffic to the LECS is reduced in two ways. First, when an LES fails, each LEC may move to the first backup LES without sending a CONFIG request to the LECS. Second, the LES's no longer need to verify each CONFIG request received from an LEC since the LEC's continuously receive updates of the LES list, including the address of the current master LES. As is described in connection with FIG. 7, traffic to the LECS may be reduced in yet another way when the LECS operates in non-preemptive mode by avoiding changing the master LES when a higher priority LES becomes available and connections have already been established to a lower priority LES.

FIG. 4 is a block diagram illustrating several of the packet formats described in connection with FIG. 3. A join request packet 410 includes a standard join request portion 412 as well as a TLV 414 that correspond to the TLV that contains the list of LES's. When an enhanced client sends such a join request containing this TLV field, even though the TLV field does not contain meaningful data for the LES, the existence of the TLV field indicates that the enhanced client is, in fact, an enhanced client. Likewise, a CONFIG request 420 from an enhanced client also includes a TLV field 424 in addition to the fields included in a standard CONFIG request. Again, the existence of the TLV field in a packet sent from an enhanced client indicates that the client is an enhanced client. In one embodiment, enhanced LEC's can send TLVs in a CONFIG request to an LECS or a join request to an LES only when instructed to do so through a command in a router or switch.

A CONFIG response 430 sent by an enhanced LECS includes standard fields found in CONFIG response packets. Inside the target ATM address field 432 the enhanced LECS sends the master LES address. In addition, the LECS sends a TLV field 434 that contains a list of all available LES's, including backup LES's. A targetless LEARP packet 440 sent from an LES to an enhanced LEC includes various standard fields as well as a TLV field 444 that is used to send the list of LES's to the client. Thus, all of the information that needs to be transferred within the LAN emulation system for the client to maintain a list of available LES's is sent using TLV fields in standard packet formats.

It should be noted that other TLV fields may be used for other purposes as well. Also, the existence of a certain TLV field in packets originating from an enhanced LEC serves as an indicator that the enhanced LEC is an enhanced LEC. Next, the various processes that run on each enhanced LECS, LES and LEC are described. These processes reduce the amount of traffic generated at the LECS while accommodating other devices that may not be enhanced.

Figure 5:
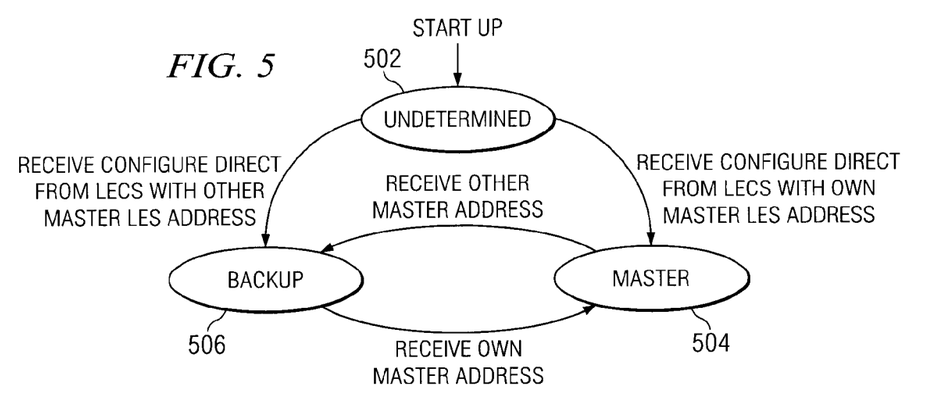
FIG. 5 is a state diagram illustrating the state of an LES upon the occurrence of certain events.

FIG. 5 is a state diagram illustrating the state of an LES upon the occurrence of certain events. Immediately after starting up, the LES state is undetermined. In various embodiments, the LES state may be initialized to master or backup. As soon as the LES receives a CONFIG direct packet from the master LECS, the state of the LES is determined by looking at the address of the master LES and comparing that address to the LES's own address. If the master LES matches the LES's own address, the LES transitions to a master state 504. If the master LES is some other address, the LES transitions to a backup state 506. If, while the LES is in backup state 506, it receives an unsolicited CONFIG response packet with its own address as the master LES address, then the LES transitions to the master state. If, while in the master state, the LES receives a packet with another address as the address of the master LES, then the LES transitions to the backup state.

When in the backup state, the LES rejects join requests and tears down connections with any unenhanced LEC's that may be connected to or attempt to connect to the LES. Likewise, the LES also rejects connections from all LEC's when it is in the backup state and it has determined that the LECS for the ELAN is an unenhanced LECS. If an unenhanced LECS is serving the ELAN, then even enhanced clients only receive a single LES address from the LECS that corresponds to only the master LES. Thus, when an unenhanced LECS is present, enhanced LEC's behave similarly to unenhanced LEC's because the enhanced LEC's only are notified of the master LES address.

Figure 6:
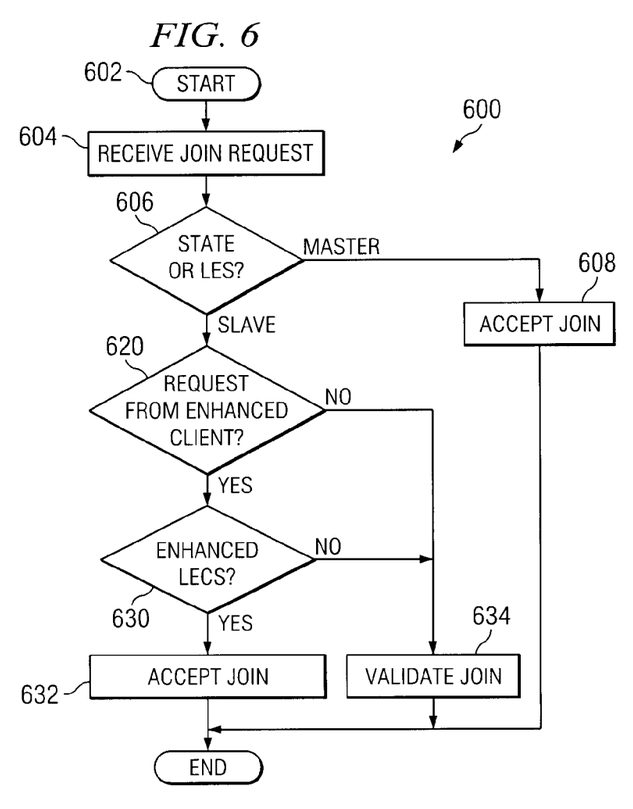
FIG. 6 is a flow chart illustrating a process 600 running on an enhanced LES for processing join requests from LEC's.

FIG. 6 is a flow chart illustrating a process 600 running on an enhanced LES for processing join requests from LEC's. The process starts at 602. In a step 604, the LES receives a join request. Next, in a step 606, the state of the LES is checked. If the LES is in the master state, then control is transferred to a step 608 and the join request is accepted. The process then ends.

If the LES is in the slave state, then control is transferred to a step 620. In step 620 it is checked whether the join request came from an enhanced client. If the join request came from an enhanced client, then control is transferred to a step 630. In step 630, it is checked whether the LECS to which the LES is connected is an enhanced LECS. If the LECS is an enhanced LECS, then the join request is accepted in a step 632 and the process ends. If the LECS to which the LES is connected is not an enhanced LECS, then the LES validates the join request in a step 634 by sending a CONFIG request to the LECS on the backend connection.

If it was determined at step 620 that the request did not come from an enhanced client, then control is transferred directly from 620 to 634 and the join request is validated by sending a CONFIG request to the LECS. If the LECS indicates that the request should be accepted, then the LECS accepts the request and if the LECS indicates that the request should be rejected, then the LES rejects the request.

Thus, the LES is able to handle join request from both enhanced and unenhanced clients in an appropriate manner according to the type of LECS, enhanced or unenhanced, to which the LES is connected. When an LES transitions from the master state to the slave state, a similar process is executed. If the LES is connected to an enhanced LECS, then connections to enhanced clients are maintained. Connections from unenhanced clients are dropped and those clients therefore send a CONFIG request to the LECS and are directed to the new master LES. If the LES is connected to an unenhanced LECS, then all of the LEC'S connected to the LES are dropped when the LES transitions to the slave state. That is because in a system with an unenhanced LECS, all clients must contact the LECS to find out the new master LES address.

Figure 7:
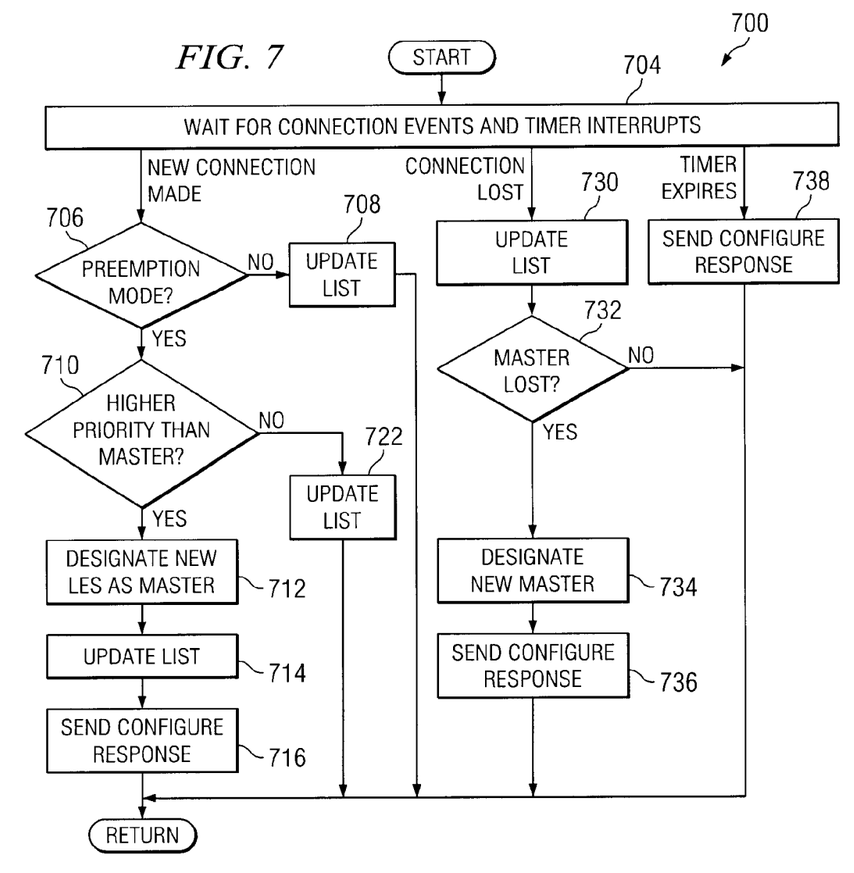
FIG. 7 is a flow chart illustrating how an LECS handles connection events.

FIG. 7 is a flow chart illustrating how an LECS handles connection events. After coming online, the LECS enters a state 704 wherein the LECS waits for connection events and timer interrupts. When a new connection is made to the LECS, control is transferred to a step 706. In step 706, it is checked whether the LECS is in preemption mode. If the LECS is not in preemption mode, then control is transferred to a step 708, the list of LES's is updated, and the LECS returns to state 704.

If the LECS is in preemption mode, then control is transferred to a step 710 where it is checked whether the new connection is from an LES that is a higher priority LES than the master LES. If the LES is a higher priority LES, then control is transferred to a step 712 and the LECS designates a new LES as the master LES. The LECS list of LES's is updated in a step 714 and in a step 716 the LECS sends a CONFIG response packet to every LES containing the new LES list and the new LES master. The LECS then returns back to state 704. If it is determined in step 710 that the new connection is not from a higher priority LES than the master LES, then control is transferred to a step 722 and the LECS list is updated and the LECS returns to state 704.

If a connection to an LES is lost, then control is transferred to a step 730 and the list of LES's is updated at the LECS. Next, in a step 732, it is determined whether or not the connection lost was the connection to the master LES. If it was not the master LES connection, then the LECS returns to state 704. If the connection lost is the master LES connection, then control is transferred to a step 734 and the LECS designates a new master LES. Next, in a step 736, the LECS sends a CONFIG response to all of the LES's indicating the new master LES and the new LES list.

If the LECS timer that controls the periodic sending of CONFIG response packets from the LECS to all of the LES's expires, then control is transferred to a step 738 and the LECS sends a CONFIG response that includes the address of the master LES as well as the list of LES addresses. The LECS then returns back to state 704. Next, the LECS periodically sends packets to all of the LES's that include an updated LES list. When an event occurs that causes the LECS to change the master LES, then the LECS immediately sends a packet to each LES updating them with the new master LES address. When a new LES establishes a connection to the LECS, then the LECS may or may not designate a new master LES depending on whether the LECS is operating in preemption mode or not.

Figure 8:
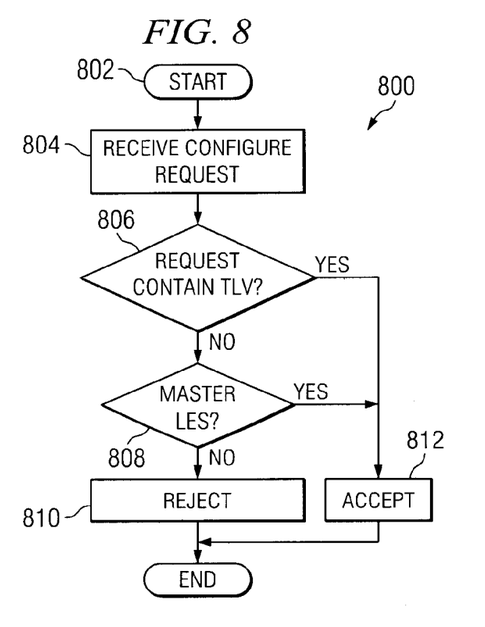
FIG. 8 is a flow chart illustrating a process 800 executed by an enhanced LECS for the purpose of handling CONFIG requests.

FIG. 8 is a flow chart illustrating a process 800 executed by an enhanced LECS for the purpose of handling CONFIG requests. The process starts at 802. In a step 804, a CONFIG request is received. Next, in a step 806, the LECS determines whether the request contains the TLV field that is used by the LECS to provide the LES list. If the CONFIG request does not contain the TLV field, then the CONFIG request came from an unenhanced LES. Therefore, control is transferred to a step 808 and the LECS determines whether or not the unenhanced LES is a master LES. If the unenhanced LES is not a master LES, then control is transferred to a step 810 and the request is rejected. If the LES is a master LES, then control is transferred to a step 812 and the request is accepted. In either event, the process ends and the LECS is ready to handle another CONFIG request.

Thus, the enhanced LECS continues to behave as an unenhanced LECS would when it receives CONFIG requests from unenhanced LES's. If the CONFIG request contains a TLV used to send the list of LES addresses, then control is transferred directly from step 806 to step 812 and the request is automatically accepted as is appropriate for requests from enhanced LES's.

Figure 9:
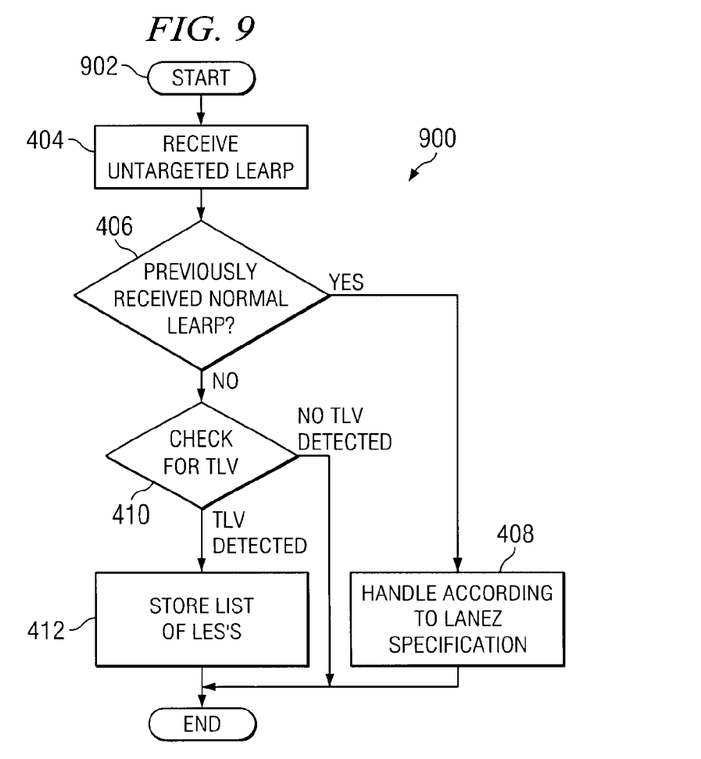
FIG. 9 is a flowchart illustrating a process executed by an LEC upon receiving a targetless LEARP on a control distribute connection from an LES.

FIG. 9 is a flowchart illustrating a process executed by an LEC upon receiving a targetless LEARP on a control distribute connection from an LES. Process 900 starts at 902. In a step 904, the LEC receives an untargeted LEARP.

Next, in a step 406, the LEC checks whether it had previously received a normal LEARP. If a normal LEARP was previously received, the control is transferred to a step 408 and the untargeted LEARP is handled according to the LANE specification and the process ends. If the LEC had not previously received normal LEARP, then control is transferred to a step 410 and the enhanced LEC checks for the TLV that contains the list of LES addresses from the LECS.

If such a TLV is detected, then control is transferred to a step 412 and the LEC stores the list of LES's and notes whether or not the address of the master LES has changed. The process then ends. If no TLV is detected in step 410, then the untargeted LEARP is either an error or is an untargeted LEARP generated for some unrelated purpose and the process ends. Thus, enhanced LEC's check untargeted LEARP's and use the untargeted LEARP's that contain a TLV listing LES's to update the list of LES's stored at the enhanced LEC.

Figure 10:
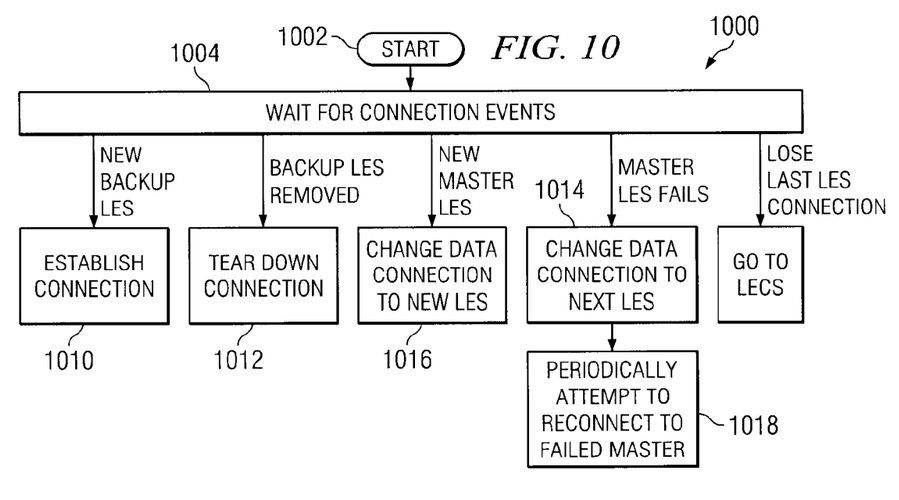
FIG. 10 is a flow chart illustrating a process 1000 executed on an enhanced LEC for the purpose of handling various connection events.

FIG. 10 is a flow chart illustrating a process 1000 executed on an enhanced LEC for the purpose of handling various connection events. Process 1000 starts 1002. The enhanced LEC enters a state 1004 where it waits for connection events. If the enhanced LEC receives notice that a new backup LES is on line, then control is transferred to a step 1010 and a connection is established with the new backup LES. If the enhanced LEC receives notice that a backup LES has been removed from the list of LES's, then control is transferred to a step 1012 and the connection to the LES is torn down. If the enhanced LEC is notified that a new master LES has been designated by the LECS, then the LEC changes its data connection to the new LES. If the LEC detects a new master LES, then the LEC changes its data connection to the new LES in a step 1016. If the LEC detects that the master LES has failed, then the LEC changes its data connection to the next LES on the list of LES's in a step 1014. In addition, a process is initiated in a step 1018 wherein the LEC periodically attempts to reconnect to the failed master LES. After each connection event is processed in the manner described, the LEC returns back to state 1004 and waits for another connection event.

A LAN emulation system has been described that includes a master LES and one or more backup LES's. Enhanced LEC's receive packets that include a list of all of the LES's and that designate a master LES. Enhanced LES's accept all connections from enhanced clients without verifying the clients with the LECS. In this manner, a large number of clients may participate in the ELAN without generating an excessive amount of traffic and overwhelming the LECS.

If a system is known to contain only enhanced LECS's, LES's, and LEC's, then the system may be used in a mode where the LES's are no longer designated as master LES's and backup LES's. Instead, each available LES may service LEC's in parallel with the other LES's. In one embodiment of such a system, LEC's are programmed to connect alternatively to different LES's for the purpose of load balancing among the LES's.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A method of transferring an enhanced local area network (LAN) Emulation Client (LEC) from a first LAN Emulation Server (LES) to a second LES, comprising:

determining an address of the first LES and the second LES respectively; and communicating the addresses of the first LES and the second LES to the enhanced LEC that is operable to store the addresses of the first LES and the second LES, wherein when the enhanced LEC determines that the first LES has failed, the address of the second LES may be looked up at the enhanced LEC and the enhanced LEC may couple to the second LES, and wherein communicating the addresses of the first LES and the second LES to the LEC includes:

determining at a LAN Emulation Configuration Server (LECS) that the first LES and the second LES are coupled to the LECS;

communicating from the LECS to the first LES and the second LES a control packet that includes the first LES address and the second LES address; and forwarding the first LES address and the second LES address from the first LES to the enhanced LEC.

2. The method of claim 1, wherein the first LES is designated as a master LES and the second LES is designated as a backup LES.

3. The method of claim 2, wherein the backup LES receives a join request from the enhanced LEC and from an unenhanced LEC, the unenhanced LEC being an LEC that does not store the addresses of the first LES and the second LES, and wherein the join request from the unenhanced LEC is rejected by the backup LES.

4. The method of claim 2, wherein a second backup LES is an unenhanced backup LES that is not configured to forward configuration information from a LAN Emulation Configuration Server (LECS) to the enhanced LEC, and wherein a CONFIG request from the unenhanced backup LES on behalf of the enhanced LEC is rejected by the LECS.

5. The method of claim 4, wherein the first LES is designated as the master LES as a result of the first LES coupling to the LECS before the second LES.

6. The method of claim 1, further comprising:

communicating to the first LES and the second LES a control packet that includes the first LES address and the second LES address.

7. The method of claim 1, wherein forwarding the first LES address and the second LES address from the first LES to the enhanced LEC includes sending an untargeted LAN emulation address resolution protocol (LEARP) that includes the first LES address and the second LES address from the first LES.

8. The method of claim 1, further comprising:

determining at the LECS that the first LES is the master LES.

9. The method of claim 8 wherein the first LES is determined to be the master LES as a result of the first LES coupling to the LECS before the second LES.

10. An apparatus, comprising:

a local area network (LAN) Emulation Configuration Server (LECS) operable to determine addresses of a first LAN Emulation Server (LES) and a second LES respectively, the first LES and the second LES being coupled to the LECS, wherein the LECS is further operable to communicate the addresses of the first LES and the second LES to an enhanced LAN Emulation Client (LEC) so that the addresses of the first LES and the second LES may be stored at the enhanced LEC, and wherein when the enhanced LEC determines that the first LES has failed, the address of the second LES may be looked up at the enhanced LEC and the enhanced LEC may couple to the second LES, wherein communicating the addresses of the first LES and the second LES to the LEC includes:
  determining at the LECS that the first LES and the second LES are coupled to the LECS;
  communicating from the LECS to the first LES and the second LES a control packet that includes the first LES address and the second LES address; and
  forwarding the first LES address and the second LES address from the first LES to the enhanced LEC.

11. A method of determining whether a local area network (LAN) Emulation Server (LES) is in a master state, comprising:
  receiving a control packet from an enhanced LAN Emulation Configuration Server (LECS), the control packet containing an address of a master LES and of a backup LES;
  forwarding the address of the master LES and the backup LES to an enhanced LAN Emulation Client (LEC); and
  entering a master LES state when the master LES address is the same as the enhanced LEC address,
    wherein forwarding the addresses of the master LES and the backup LES to the enhanced LEC includes:
      determining at the enhanced LECS that the master LES and the backup LES are coupled to the enhanced LECS;
      communicating from the enhanced LECS to the master LES and the backup LES a control packet that includes the master LES address and the backup LES address; and
      forwarding the master LES address and the backup LES address from the master LES to the enhanced LEC.

12. An enhanced local area network (LAN) Emulation Server (LES) having an enhanced LES address configured to:
  receive a control packet from an enhanced LAN Emulation Configuration Server (LECS), the control packet containing an address of a master LES and of a backup LES;
  forward the address of the master LES and the backup LES to an enhanced LAN Emulation Client (LEC); and
  enter a master LES state when the master LES address is the same as the enhanced LES address, wherein the enhanced LES is further configured to accept loin requests from enhanced clients that are serviced by the enhanced LECS without first verifying the join requests with the enhanced LECS.

13. The enhanced LES of claim 12, wherein the enhanced LES is further configured to reject join requests from unenhanced clients when the enhanced LES is not in the master LES state.

14. The enhanced LES of claim 12, wherein the enhanced LES forwards the address of the master LES and the backup LES to an enhanced LEC using an untargeted LEARP.

15. An enhanced local area network (LAN) Emulation Configuration Server (LECS) configured to:
  detect a first connection from a first LAN Emulation Server (LES) and a second connection from a second LES;
  designate the first LES as a master LES and the second LES as a slave LES; and
  selectively send a control packet to the first LES and the second LES that includes an address of the master LES, wherein the enhanced LECS is configured in a preemptive mode, and wherein the enhanced LECS designates an LES with a configured priority as the master LES.

16. The enhanced LECS of claim 15, wherein the enhanced LECS is configured in a nonpreemptive mode, and wherein the enhanced LECS designates the LES that couples first to the LECS as the master LES.

17. The enhanced LECS of claim 15, wherein the control packet further includes a list of LESs coupled to the enhanced LECS.

18. The enhanced LECS of claim 15, wherein the enhanced LECS is configured to detect failure of the master LES and to send a control packet to the second LES that designates the second LES address and a new master LES address.

19. A system for transferring an enhanced local area network (LAN) Emulation Client (LEC) from a first LAN Emulation Server (LES) to a second LES, comprising:
  means for determining addresses of the first LES and the second LES respectively;
  means for communicating the addresses of the first LES and the second LES to the enhanced LEC;
  means for storing the addresses of the first LES and the second LES;
  means for determining that the first LES has failed;
  means for looking up the address of the second LES; and
  means for coupling the enhanced LEC to the second LES,
    wherein communicating the addresses of the first LES and the second LES to the LEC includes:
      determining at a LAN Emulation Configuration Server (LECS) that the first LES and the second LES are coupled to the LECS;
      communicating from the LECS to the first LES and the second LES a control packet that includes the first LES address and the second LES address; and
      forwarding the first LES address and the second LES address from the first LES to the enhanced LEC.

20. The system of claim 19, wherein the means for communicating the addresses of the first LES and the second LES to the enhanced LEC includes:
  means for determining that the first LES and the second LES are coupled to a LAN Emulation Configuration Server (LECS);
  means for communicating to the first LES and the second LES a control packet that includes the first LES address and the second LES address; and
  means for forwarding the first LES address and the second LES address to the LEC.

21. Software embodied in a computer readable medium for transferring a local area network (LAN) Emulation Client (LEC) from a first LAN Emulation Server (LES) to a second LES, the medium comprising computer code for:
  determining addresses of a first LES and a second LES respectively; and
  communicating the addresses of the first LES and the second LES to an enhanced LEC so that the addresses of the first LES and the second LES may be stored at the enhanced LEC, wherein when the enhanced LEC determines that the first LES has failed, the address of the second LES may be looked up at the enhanced LEC and the enhanced LEC may couple to the second LES,
  wherein communicating the addresses of the first LES and the second LES to the LEC includes:

determining at an LECS that the first LES and the second LES are coupled to a LAN Emulation Configuration Server (LECS);

communicating from the LECS to the first LES and the second LES a control packet that includes the first LES address and the second LES address; and forwarding the first LES address and the second LES address from the first LES to the enhanced LEC.

22. The medium of claim 21, wherein the first LES is designated as a master LES and the second LES is designated as a backup LES.

23. The medium of claim 22, wherein the backup LES receives a join request from the enhanced LEC and from an unenhanced LEC, the unenhanced LEC being an LEC that does not store the addresses of the first LES and the second LES, and wherein the join request from the unenhanced LEC is rejected by the backup LES.

24. The medium of claim 22, wherein the second LES is an unenhanced backup LES that is not configured to forward configuration information from an a LAN Emulation Configuration Server (LECS) to the enhanced LEC, and wherein a CONFIG request from the unenhanced backup LES on behalf of the enhanced LEC is rejected by the LECS.

25. The medium of claim 24, wherein the first LES is designated as the master LES as a result of the first LES coupling to the LECS before the second LES.

26. The medium of claim 21, wherein communicating the addresses of the first LES and the second LES to the LEC includes:

determining that the first LES and the second LES are coupled to an LECS;

communicating to the first LES and the second LES a control packet that includes the first LES address and the second LES address; and forwarding the first LES address and the second LES address to the LEC.

27. The medium of claim 21, wherein the code is further operable to communicate to the first LES and the second LES a control packet that includes the first LES address and the second LES address.

28. Software embodied in a computer readable medium for transferring an enhanced local area network (LAN) Emulation Client (LEC) to a backup LAN Emulation Server (LES), the medium comprising computer code for:

determining addresses of a first LES and a second LES, the first LES and the second LES being coupled to a LAN Emulation Configuration Server (LECS) ;communicating the addresses of the first LES and the second LES to an enhanced LEC;

storing the addresses of the first LES and the second LES;

determining that the first LES has failed;

identifying the address of the second LES; and coupling the enhanced LEC to the second LES, wherein communicating the addresses of the first LES and the second LES to the LEC includes:

determining at the LECS that the first LES and the second LES are coupled to the LECS;

communicating from the LECS to the first LES and the second LES a control packet that includes the first LES address and the second LES address; and forwarding the first LES address and the second LES address from the first LES to the enhanced LEC.

* * * * *

UNITED STATES PATENT AND TRADEMARK OFFICE
CERTIFICATE OF CORRECTION

PATENT NO. : 6,701,448 B1  
DATED : March 2, 2004  
INVENTOR(S) : Cihangir M. Akyol et al.

It is certified that error appears in the above-identified patent and that said Letters Patent is hereby corrected as shown below:

Title page,
Item [75], Inventors, after "Bradley A. Benson, Portola Valley," delete "VA" and insert -- CA --.

Column 15,
Line 50, after "accept" delete "loin" and insert -- join --.

Signed and Sealed this

Twenty-fourth Day of August, 2004

JON W. DUDAS  
*Director of the United States Patent and Trademark Office*